W. H. JONES.
FRUIT DRYING TRAY.
APPLICATION FILED NOV. 30, 1921.

1,414,649.

Patented May 2, 1922.

INVENTOR
William H. Jones
BY
Francis C. Huebner
ATTORNEY

UNITED STATES PATENT OFFICE.

WILLIAM H. JONES, OF SANGER, CALIFORNIA.

FRUIT-DRYING TRAY.

1,414,649.  Specification of Letters Patent.  Patented May 2, 1922.

Application filed November 30, 1921. Serial No. 518,798.

*To all whom it may concern:*

Be it known that I, WILLIAM H. JONES, a citizen of the United States, and resident of Sanger, in the county of Fresno and the State of California, have invented a new and useful Improvement in Fruit-Drying Trays, of which the following is a specification.

My invention relates to an improved fruit drying tray which can be quickly and easily adjusted to a position to protect the fruit thereon from the rain. It is commonly known that in the State of California raisins and other fruits are cured in the sun, that for this purpose the fresh fruit is placed upon trays which are laid on the ground in the sun, such trays being usually constructed with rigid frames, and having bottoms therein, that in case of rain it is necessary to stack the trays one on the top of another with the fruit thereon, and to cover such stack of trays with a waterproof covering. Paper trays are sometimes substituted for wooden trays but the paper is easily damaged and torn when it is wet, and the paper trays seldom last more than one season. In my invention I provide a wooden tray which has the advantages of continuous use from season to season, and which can be readily rolled up with the drying fruit therein, a portion of the tray being adapted to form a covering for the balance of the tray and fruit.

Figure 1:
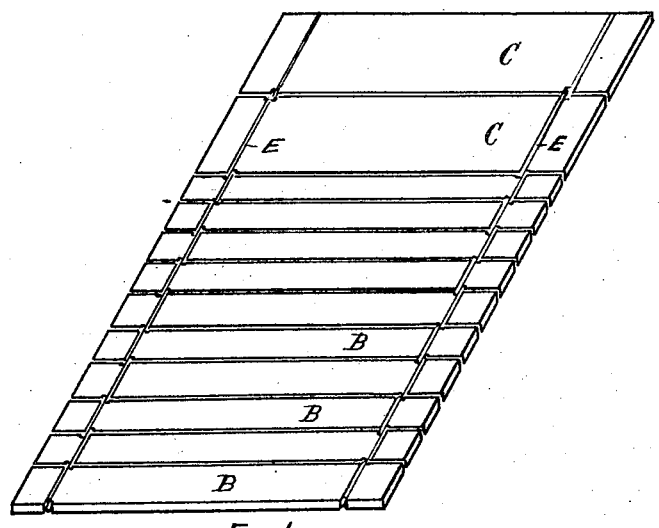
Figure 2:
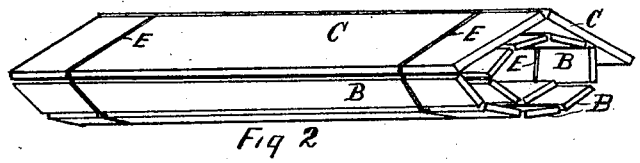
Figure 3:
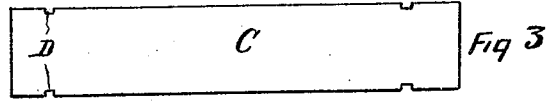
Figure 4:
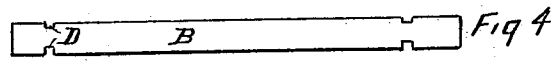
Figure 5:
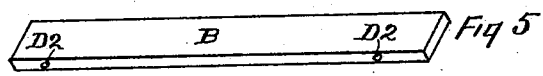

I accomplish these objects by means of the device hereinafter illustrated and described in the accompanying drawing in which Figure 1 shows a top perspective view of the completed tray. Figure 2 shows the tray rolled up and in a position for shedding the rain. Figures 3 and 4 show top views of a board and a strip used in the construction of the tray. Figure 5 is a view of one of the strips having holes therethrough for the purpose of attaching a plurality of said strips together to form a tray.

In said drawing B are a plurality of narrow strips and C are two wide boards. These strips and boards have notches D in the edge thereof. E is a soft, pliable, tough wire which is used to attach the boards and strips together. In Figure 1 the tray is constructed by weaving the boards and strips between wires on opposite sides. Instead of weaving the slats between wires as shown, a single wire on each side can be run through the holes $D^2$. The wire E should be very soft and pliable so that it will act as a hinge between adjacent strips and should be galvanized in order to keep it from rusting. Other material such as twine may be used instead of the wire. As shown in Figure 2 the tray can be rolled up with the fruit thereon. The rolling should start from the end having the small strips thereon so that when the roll is completed the wide boards C will form a gable roof over the roll thus protecting from rain the tray and the fruit which may be therein and rolled up with said tray.

Having described my invention I claim as new and ask for Letters Patent:

A drying tray composed of a plurality of small slats and two wider boards hinged together, the wider boards adapted to form a roof over the balance of the tray when rolled, substantially as described.

WILLIAM H. JONES.